United States Patent [19]

Recht

[11] Patent Number: 5,625,705
[45] Date of Patent: Apr. 29, 1997

[54] INTENSITY TEXTURE BASED CLASSIFICATION SYSTEM AND METHOD

[75] Inventor: Joel M. Recht, Monsey, N.Y.

[73] Assignee: Neuromedical Systems, Inc., Suffern, N.Y.

[21] Appl. No.: 253,713

[22] Filed: Jun. 3, 1994

[51] Int. Cl.⁶ ........................................ G06K 9/00
[52] U.S. Cl. .................................. 382/128; 382/133
[58] Field of Search ........................... 382/100, 133, 382/128; 348/400, 409, 128; 358/518; 364/413.1

[56] References Cited

U.S. PATENT DOCUMENTS

| | | | |
|---|---|---|---|
| 4,207,554 | 6/1980 | Resnick et al. | 382/133 |
| 4,618,937 | 10/1986 | Elias et al. | 382/100 |
| 4,661,913 | 4/1987 | Wu et al. | 382/133 |
| 4,853,777 | 8/1989 | Hupp | 348/128 |
| 4,965,725 | 10/1990 | Rutenberg | 364/413.1 |
| 5,103,306 | 4/1992 | Weiman et al. | 348/400 |
| 5,107,422 | 4/1992 | Kamentsky et al. | 382/133 |
| 5,117,293 | 5/1992 | Asada et al. | 358/518 |
| 5,194,949 | 3/1993 | Poulsen et al. | 382/128 |
| 5,257,182 | 10/1993 | Luck et al. | 364/413.1 |
| 5,287,272 | 2/1994 | Rutenberg et al. | 364/413.01 |
| 5,333,207 | 7/1994 | Rutenberg | 382/6 |
| 5,353,061 | 10/1994 | Rodriguez et al. | 348/409 |

OTHER PUBLICATIONS

Oldham, W.J.B. et al. "Neural Network Recognition of Mammographic Lesions", 73rd Scientific Assembly and Annual Meeting of the Radiological Society of North America, Nov. 1987.

*Primary Examiner*—Jose L. Couso
*Attorney, Agent, or Firm*—Renner, Otto, Boisselle & Sklar

[57] ABSTRACT

A method for classifying objects within a specimen as likely to be premalignant or malignant cells includes the steps of forming an intensity image of a specimen, calculating and storing the maximum and minimum grey scale values at a plural number of distances from a pixel in the intensity image, finding the difference between the maximum and minimum grey scale values at like distances from the pixel, determining the slope of the log of the differences as a function of the log of the distances, storing the slope at the pixel location in a resultant image, and identifying objects in the intensity image as likely to be malignant or premalignant based on the value of the slope.

12 Claims, 3 Drawing Sheets

INTENSITY TEXTURE BASED CLASSIFICATION SYSTEM AND METHOD

TECHNICAL FIELD OF THE INVENTION

This invention relates generally to a system and method for efficiently computing the fractal dimension of a surface, particularly to a system and method for use in a digital signal processor for determining efficiently the fractal dimension of an intensity image, and, more particularly, to a system and method for use in assisting the classification of cells based on the intensity texture of the nucleus of a cell.

BACKGROUND OF THE INVENTION

In the medical industry there is often the need for an experienced laboratory technician to review a specimen of biological matter for the presence of cells of a certain cellular type. An example of this is the need to review a Pap smear slide for the presence of malignant or premalignant cells. A Pap smear often contains as many as 100,000 to 200,000 or more cells and other objects, each of which a technician must individually inspect in order to determine the possible presence of very few malignant or premalignant cells. Pap smear tests, as well as other tests requiring equally exhausting cell inspection techniques, have therefore suffered from a high false negative rate due to the tedium and fatigue imposed upon the technician.

Several thousand women die each year in the United States alone from cervical cancer; a cancer from which a woman theoretically has a high probability of survival if detected in its early in situ stages. If not detected early, however, the chances of survival may decrease. If a malignant cell in a Pap smear is missed, by the time the woman has another Pap smear performed the cancer may have advanced to its invasive stage from which a woman has a smaller chance of survival. Consequently, the importance of detecting the presence of only one or a few malignant or premalignant cells among the hundreds of thousands of cells in a smear cannot be overstated. Unfortunately, present manual screening methods are inaccurate. In fact, recently some laboratories have been found to have incorrectly classified as benign up to 30% of the specimens containing malignant or premalignant cells. Also unfortunate is that many prior attempts to automate the cell inspection or classification have been unsuccessful.

One system successful at helping to improve the accuracy of cell classification is that disclosed in U.S. Pat. Nos. 5,287,272; 5,257,182; and 4,965,725 and U.S. patent application Ser. Nos. 07/425,665 pending, Ser. No. 07/502,611 abandoned, Ser. No. 07/944,819 now U.S. Pat. No. 5,333,207, Ser. No. 08/196,714 pending and Ser. No. 08/196,982 now U.S. Pat. No. 5,544,650, which are incorporated in their entireties by this reference. A commercially available automated Pap smear screener, using a primary classifier in conjunction with a neurocomputer based secondary classifier is produced by Neuromedical Systems, Inc.® of Suffern, N.Y. under trademark PAPNET™.

SUMMARY OF THE INVENTION

The present invention provides a system and method for improving the classification of specimens by employing a surface texture analysis. The system employs fixed point arithmetic logic, a hardware ranker and a number of lookup tables to estimate efficiently the fractal dimension of an area of the image using a Hurst operator.

In accordance with one aspect of the present invention, a method for classifying objects within a specimen as likely to be premalignant or malignant cells includes the steps of forming an intensity image of a specimen, calculating and storing the maximum and minimum grey scale values at a plural number of distances from a pixel in the intensity image, finding the difference between the maximum and minimum grey scale values at like distances from the pixel, determining the slope of the log of the differences as a function of the log of the distances, storing the slope at the pixel location in a resultant image, and identifying objects in the intensity image as likely to be malignant or premalignant based on the value of the slope.

In accordance with another aspect of the invention, a method for classifying objects based on surface texture includes the steps of forming an intensity image of the surface of the object, using a hardware ranker to find the maximum and minimum grey scale values at a plural number of distances from each pixel in the intensity image, subtracting the minimum grey scale values from the maximum grey scale values at like distances from each the pixel, looking up the slope of the log of the differences as a function of the log of the distances in a look up table for each pixel, and identifying objects in the intensity image as likely to have a certain characteristic based on the values of the slopes.

In accordance with a further aspect of the invention, a system for classifying objects based on surface texture includes a camera which obtains an intensity image of the surface of the object, a ranker which finds the maximum and minimum grey scale values at a plural number of distances from each pixel in the intensity image, an arithmetic logic unit which subtracts the minimum grey scale values from the maximum grey scale values at like distances from each the pixel, and a lookup table containing the slope of the log of the differences as a function of the log of the distances.

These and other objects, advantages, features and aspects of the present invention will become apparent as the following description proceeds.

To the accomplishments of the foregoing and related ends, the invention, then comprises the features hereinafter fully described in the specification and particularly pointed out in the claims. The following description and the annexed drawings set forth in detail a certain illustrative embodiment of the invention, this being indicative, however, of but one of the various ways in which the principals of the invention may be employed. It will be appreciated that the scope of the invention is to be determined by the claims and the equivalents thereof.

DETAILED DESCRIPTION OF THE INVENTION

Figure 1:
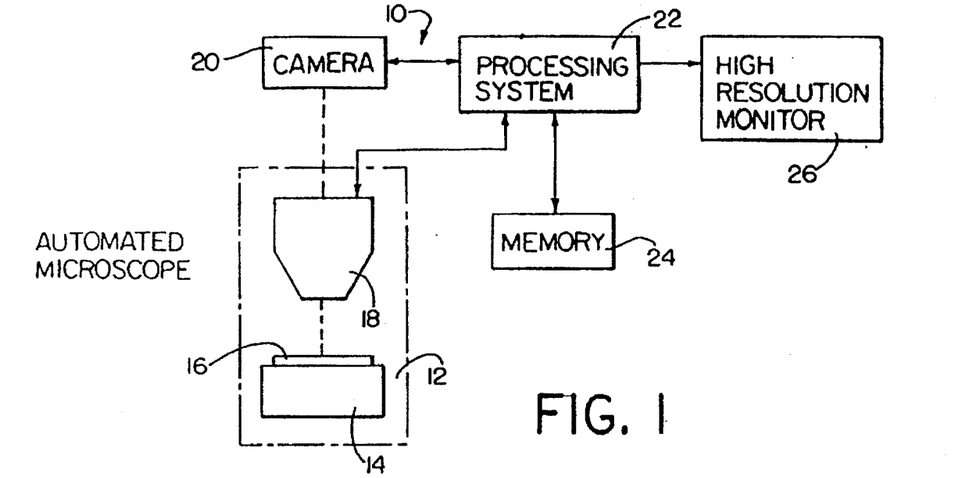
FIG. 1 is a schematic illustration of a cytological or histological classification system in accordance with the present invention.

With reference to the several figures in which like reference numerals depict like items, and initially to FIG. 1, there is shown an automated cell classification device 10 in accordance with the present invention. Briefly, the device 10 includes an automated optical microscope 12 having a motorized stage 14 for the movement of a slide 16 relative to the viewing region of the viewing portion 18 of the microscope, a camera 20 for obtaining electronic images from the optical microscope, a processing system 22 for classifying objects in the images as likely to be of a predetermined cell type, and a memory 24 and a high resolution color monitor 26 for the storage and display respectively of objects identified by the processing system as being likely to be of that predetermined cell type.

In its preferred embodiment the classification device 10 is completely, or nearly completely, automated. As such the microscope 12 will preferably include, in addition to the motorized stage 14, automated apparatus for focussing, for changing lens objectives between high and low power, and for adjustment of the light incident of the slide, as well as circuitry for controlling the movement of the motorized stage, typically in response to a command from the processing system. The microscope may also include an automated slide transport system for moving the slides containing the specimen to be classified on to and off of the motorized stage, a cell dotter for marking relevant areas of the slide, and a bar code reader for reading encoded information from the slide. An example of an automated microscope performing at least some of these functions is manufactured by McBain Instruments of California.

Figure 2:
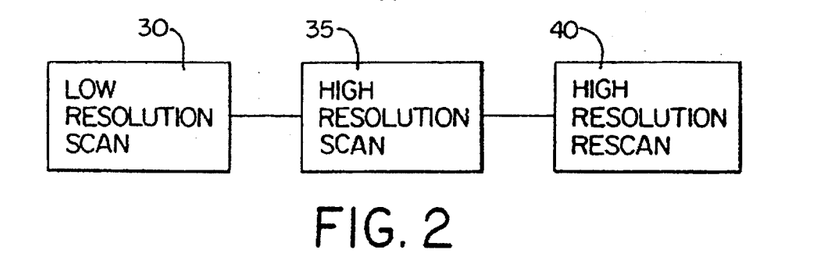
FIG. 2 is a diagrammatic illustration of the scanning passes which the screening system performs.

In accordance with the invention the automated microscope 12 preferably performs at least three scans of the slide having the specimen disposed thereon, as shown diagrammatically in FIG. 2. The first scan of the slide is performed at a relatively low resolution, for example 8 microns per pixel, and is called the low resolution scan (30). The second scan is performed at a higher resolution, for example ½ micron per pixel, and is called the high resolution scan (35). The third scan is referred to as the high resolution rescan and preferably has a resolution of ½ micron per pixel (40).

During the first scan (30) of the slide, approximate focal planes for the specific areas of the slide are found and it is determined whether that area of the slide contains a portion of the specimen. Once a low resolution scan (30) has been performed of the whole slide, and the focal planes and areas of the slide containing the specimen have been logged, the high resolution scan (35) is performed.

The high resolution scan (35) is performed only on the areas of the slide found in the low resolution scan (30) to contain a portion of the specimen. Consequently, the comparatively long high resolution scan (35) is performed only on relevant areas of the slide and the processing time is greatly reduced. During the high resolution scan (35), the automated microscope 12 scans the relevant areas of the slide, and the camera 20 takes electronic images of these areas and sends the images to the processing system 22. The processing system performs a primary classification of the image which identifies biological objects in the specimen having attributes typical of the cell class for which screening is being performed, such as malignant cells. For the identification of malignant cells, the primary classification would typically segment cells from the specimen based on the size of the nucleus, the overall grey scale density of the nucleus and the texture or variations in the grey scale intensity over the surface of the nucleus. Using a smaller and preferably lower resolution, for example 2 micron per pixel, sub-image centered around the center of the objects, the processing system 22 performs a secondary classification which assigns each object a value or ranking indicative of the possibility that the object is a cell of the type for which classification is being performed. Simultaneously, the objects are also ranked based on the value assigned through the secondary classification.

Upon completion of the high resolution scan (35), the high resolution rescan (40) is performed for the highest 64 ranked objects. During the rescan (40) the automated microscope 12 will move to each of the highest 64 ranked objects and the camera 20 will obtain a high resolution color image of the object. These 64 high resolution images, called color tiles, are then stored in the memory 24 which may be a removable device, such as an optical disk or a tape, etc., or a fixed storage device such as a hard disk. Alternatively, the sixty-four color tiles may be transferred to another computer via a network or through transportation of the data on a removable storage media.

The sixty-four color tiles make up a summary screen which is preferably an 8×8 matrix of high resolution color tiles featuring a suspect cell in the center of each tile. It will be appreciated, however, that other numbers of color tiles may be displayed concurrently to produce a summary screen, such as a 4×4 matrix. These summary screens are displayed on the high resolution color monitor 26 for tertiary analysis and classification by a cytotechnician. This analysis may take place at anytime after the highest sixty-four have been secondarily classified and ranked. Further, through the use of a removable memory device or a network connection, the images and tiles of the summary screen may be transferred to a workstation remote from the microscope 18, camera 20 and processing system 22 for display and analysis. In such an instance a separate graphics processor 41 may be employed to drive the high resolution color monitor 26 and provide a suitable interface with the cytotechnician.

A cytotechnician can easily scan the summary screen in search of an object having the attributes of the cell type for which classification is being performed. If the system is being used to screen a Pap smear for the presence of cervical cancer, the cytotechnician would typically look for cells having attributes of malignant or premalignant cervical cells, such as a comparatively large, dark nucleus.

Herein the screening system and method of the present invention will be described as used in screening a Pap smear for the presence of cervical cancer cells. However, it will be apparent to a person of ordinary skill in the art that this is only an illustrative use and that the present invention may be used in screening samples of other biological matter taken by a variety of cell sampling techniques, such as aspiration and exfoliation to name but two. The system and method are also applicable to classification of histological specimens and specimens which have been treated with any of a variety of immunohistochemical stains and markers. Further it will be apparent that while the illustrative example screens for malignant or premalignant cells, the screening may be performed for the detection of other cell classes or types.

Figure 3:
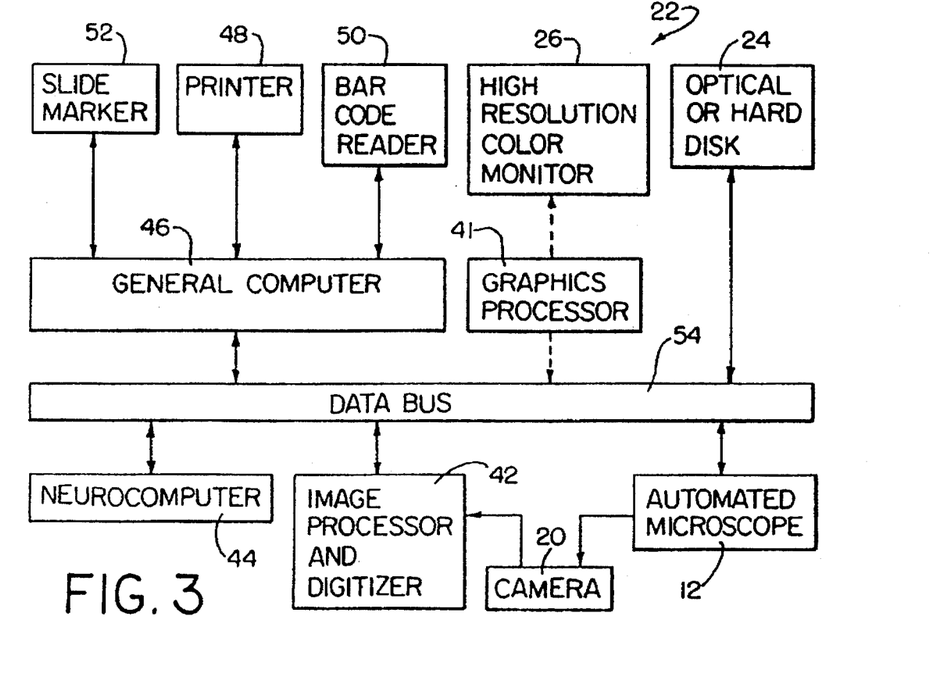
FIG. 3 is a schematic illustration of the classification system of FIG. 1 with particular emphasis on the processing system.

Turning now to a more in-depth discussion of the present invention with specific reference to FIG. 3, the screening device 10 is shown with particular emphasis on the classification elements embodied in the processing system 22. The processing system 22 preferably includes an image processor and digitizer 42, a neurocomputer 44, and a general processor 46 with peripherals for printing, storage, etc.

The general processor 46 is preferably an Intel® 80486 microprocessor or faster microprocessor based microcomputer although it may be another computer-type device suitable for efficient execution of the functions described herein. The general processor 46 controls the functioning of and the flow of data between components of the device 10, may cause execution of additional primary feature extraction algorithms and handles the storage of image and classification information. The general processor 46 additionally controls peripheral devices such as a printer 48, a storage device 24 such as an optical or magnetic hard disk, a tape drive, etc., as well as other devices such as a bar code reader 50, a slide marker 52, autofocus circuitry, a robotic slide handler, and the stage 14.

The image processor and digitizer 42 performs the primary cell classification functions described more fully below. The image processor and digitizer 42 may be a low level morphological feature extraction image classifier such as the ASPEX Incorporated PIPE® image processor which includes among other things an image digitization function and an ISMAP (Iconic to Symbolic Mapping) board. The exemplary PIPE® image processor is described more fully in U.S. Pat. No. 4,601,055, the entire disclosure of which is incorporated by this reference. Preferably the image processor 42 includes at least one hardware ranker or rank-value filter, a number of two value look up tables, an arithmetic logic unit and sufficient image memory to accommodate the storage requirements discussed below. The image processing and digitization functions could alternatively be separated into two or more components. Below, the image processor and digitizer will be conjunctively referred to as the image processor 42.

Secondary cell classification is performed by at least one neurocomputer 44. The neurocomputer 44 is a computer embodiment of a neural network trained to identify suspect cells based on an image input alone or in combination with other information regarding the image, such as a quantitative measure of the texture of the nucleus as provided by a fractal analysis of the surface of the nucleus. In this embodiment, the parallel structure of a two or three-layer backpropagation neural network is emulated with pipelined serial processing techniques executed on one of a host of commercially available neurocomputer accelerator boards. The operation of these neurocomputers is discussed in Hecht-Nielsen, Robert, "Neurocomputing: Picking the Human Brain", IEEE Spectrum, March, 1988, pp. 36–41. The neural network is preferably implemented on an Anza Plus™ processor, which is a commercially available neurocomputer of Hecht-Nielsen Neurocomputers. Such a neurocomputer could be easily configured to operate in a manner suitable to perform the secondary classification functions by one of ordinary skill in the art through reference to corresponding manuals, etc. Alternatively, secondary cell classification functions could be performed using a template matching algorithm designed to identify shapes known to be typical of a pathological cell. A template matching or other group processing algorithm could be efficiently implemented in a parallel distributed processing network, for example. Another alternative secondary classification embodiment is a holographic image processor designed to perform group based classification.

The image processor 42, the neurocomputer 44, and the general computer 46 may each access read-only and/or random access memory, as would be readily apparent to one skilled in the art, for the storage and execution of software necessary to perform the functions described relative to that processing component. Further, each component 42, 44, 46 includes circuitry, chips, etc. for the control of communication or data transfer over the data bus 54 as well as other functions typical of similar processors as would be appreciated.

Returning to a discussion of the operation of the device 10 the area of the slide 16 possibly containing the biological matter of the specimen is segmented into a plurality of equal sized fields. Each field occupies an area of the slide which corresponds to an individual image to be viewed one by one by the microscope. Once digitized by the image processor 42, each field will be represented by, for example, a 512 by 484 matrix or array of pixels. Each pixel then represents the brightness, or gray scale density of a discrete area of the field image. The gray scale density of each pixel is further represented by an 8 bit digital value. Consequently, each pixel will represent an area of the field image by a gray scale level ranging from zero to 255. In operation, the screening device will perform a low resolution scan (30) on each field to determine if that field contains biological matter, and a high resolution scan (35) on each of the fields having biological matter to detect objects contained therein which are likely to be malignant or premalignant cells. A third scan (40), the high resolution rescan, may also be performed on a field, or a portion of a field, if during the high resolution scan (35) the processing system found an object within the field which is likely to be a malignant or premalignant cell.

During the low resolution scan (30), the objective of the microscope 12 is set at the appropriate magnification power and the microscope begins scanning the individual fields of the slide 16. For each field, the microscope 12 will automatically determine the approximate focal plane for that area of the slide 16. As the cover slip covering the specimen tends to be somewhat wavy or possibly angled, such as due to air bubbles contained under the cover slip, the focal plane may vary from field to field. Once the focus is determined for the field being viewed, the camera 20 will capture the image of the field and send that image to the image processor 42 through a suitable digitizer. The image processor 42 then determines whether there are areas of interest in each field corresponding to objects which may be biological material. If a field contains material which may be biological, the field is identified along with its approximate focal plane and stored in memory for future analysis during the high resolution scan (35). This low resolution scan (30) is performed for all fields on the slide 16.

Once the low resolution scan (30) has been completed and all of the fields containing objects which are possibly biological material have been identified in memory, the high resolution scan (35) is begun. Initially, a scan path is determined which will allow the microscope 12 to view each field possibly containing biological matter preferably with the least amount of movement of the slide 16. For the high resolution scan (35), an objective corresponding to the ½ micron per pixel resolution is inserted into the viewing path of the microscope 12, and the scan is begun at the first field in the scan path. The microscope 12, via the motorized stage 14 will move the slide 16 into a position such that the first field, which was identified as having biological material during the low resolution scan, will be in the field of view of the microscope. The microscope 12 will then, based initially on the focal plane determined during the low resolution scan (30), focus the field under the high resolution magnification level. The field is digitized to create a gray scale intensity image and the image processor 42 then performs the primary classification of the objects in the intensity image as discussed more fully below. This primary classification finds the centroids of objects in each intensity image that have the correct size and gray scale density characteristics. The primary classification also separately finds objects in each intensity image having a nucleus with a surface intensity texture that is representative of a certain cell characteristic, such as dysplasia.

When an object in an intensity image has been identified as having the size and gray scale density or surface intensity texture characteristics of a premalignant or malignant cell, a N×N array of pixels, for example 24 by 24 or 48 by 48, surrounding the object, called a net image, is transferred to the secondary classifier for further classification. Net images of the required objects may be obtained through a further scan of the specimen or by from the high resolution image obtained during the high resolution scan.

The highest 64 ranked objects are displayed on the summary screen 26. As discussed above, the summary screen may be an 8×8 matrix of 64 discrete images, called color tiles, a 4×4 arrangement of 16 color tiles, or some other arrangement. Color tiles are obtained during the rescan pass (40). Each color tile represents an approximately 128×104 micron area surrounding the centroid of a suspect cell, with a resolution of one micron per pixel. Each color tile produces a high resolution color image of a suspect cell and surrounding cells and biological matter, with the suspect cell centered in the tile. By reviewing the summary screen 26, the cytotechnician can relatively easily classify the high resolution color images of the suspect cells.

It will be appreciated by a person of ordinary skill in the art that while particular resolutions and image sizes were described above, these particular values are exemplary. It will further be appreciated that different resolutions, image parameters, magnification levels, etc., can be employed to accomplish the same or similar results as the particular embodiment of the invention described above, and that all such differing resolutions, image parameters, etc. are within the scope of the present invention.

Figure 4A:
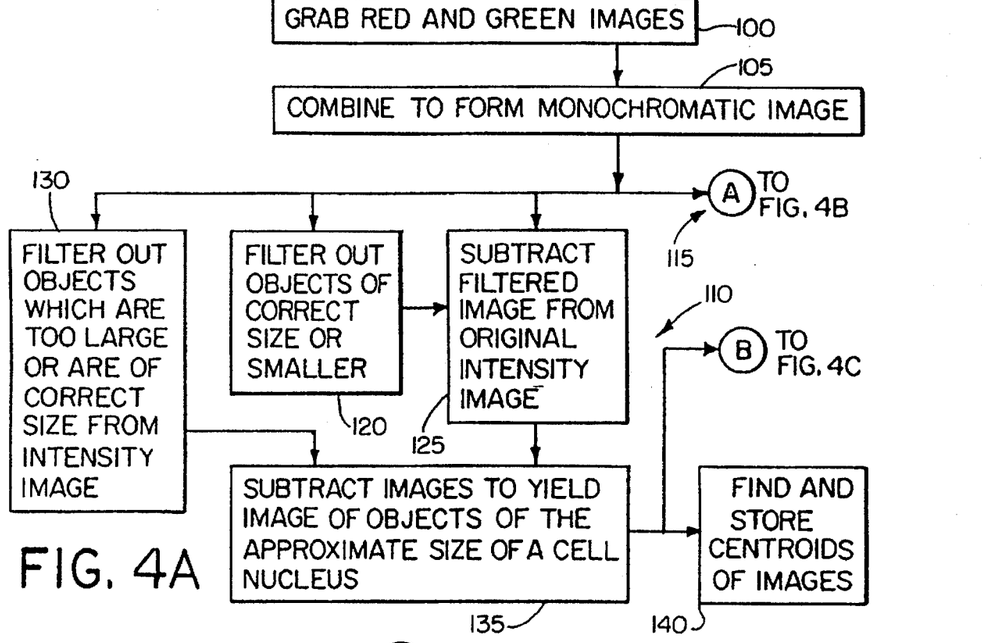
FIGS. 4a through 4c are flowcharts illustrating the primary classification function of the present invention.
Figure 4B:
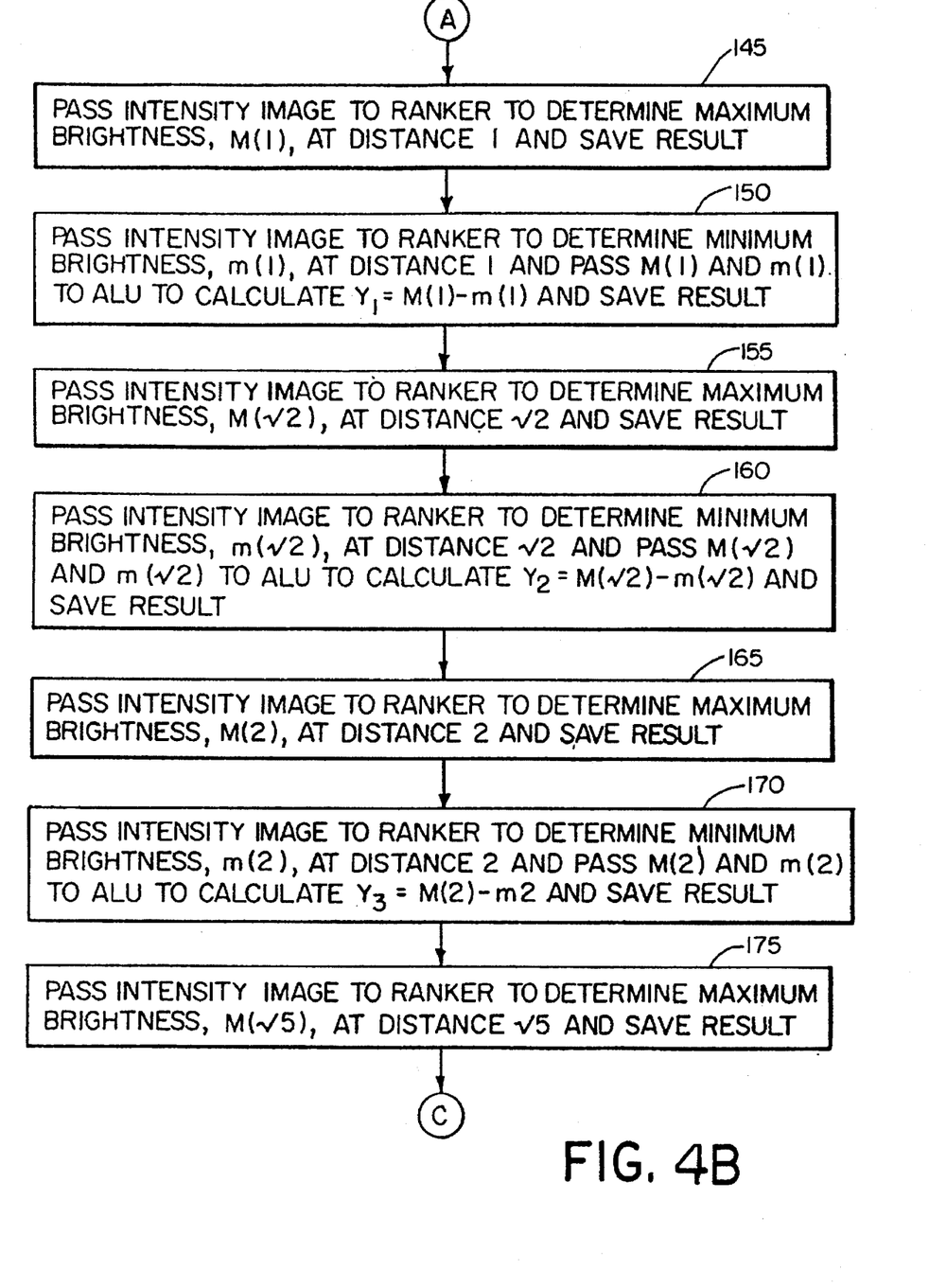
Figure 4C:
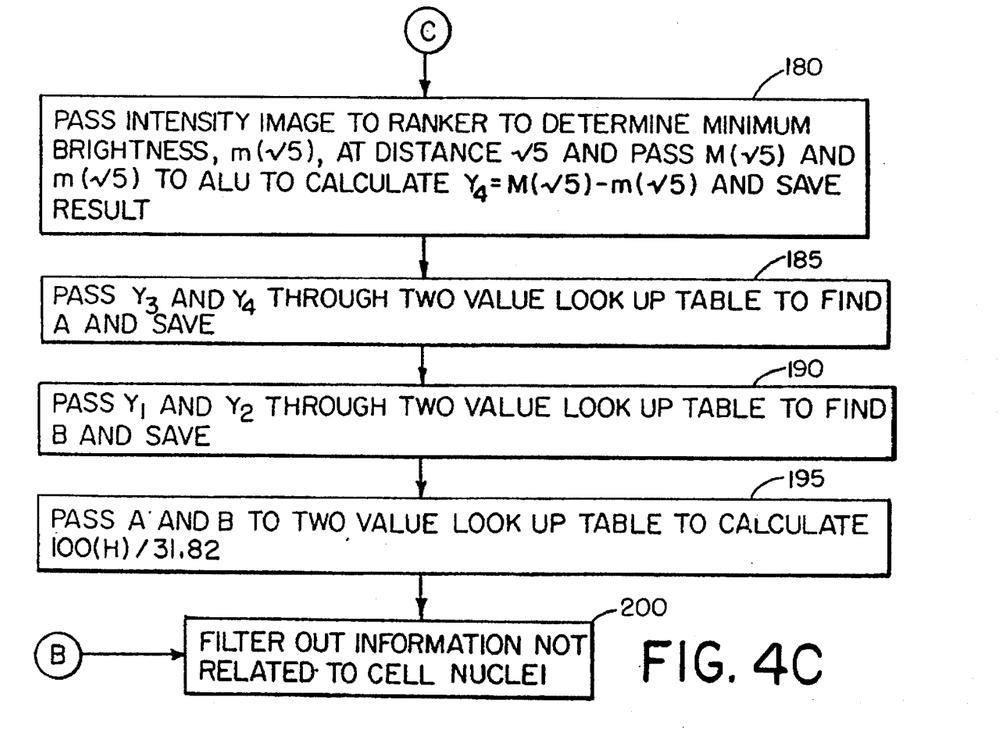

Turning to a more in-depth discussion of the primary classification routine, and referring to FIGS. 4a through 4c, there is shown a flowchart of the primary classification functions which the image processor 42 performs. Numbers contained within parentheses below correspond to like numbered steps in the flowchart. Similarly, letters contained within parentheses denote the flow of image data at various steps in the flowchart. Once a field of the specimen has been focused and taken by the camera 20, the image processor 42 will digitize the field and grab the 8 bit gray scale red and green images from the camera (100). The red and green 8 bit gray scale images are then combined to produce a monochrome intensity image (105) which is stored in a segment of memory of the image processor 42, called the frame buffer. The Papanicolaou stain used in treating a Pap smear dyes the nuclei of biological cells within the smear a purple color. Since the colors red and green when combined approximately equally make a yellowish green color which is directly opposite the color purple on a color space triangle, combining red and green, without blue, creates an image wherein the purple stained nuclei appear very dark and the areas of other colors appear brighter. Other stains, color responses and measurements may also be used.

Briefly, the primary classifier performs two segmentation routines to segment out suspicious objects from the intensity image based on a variety of characteristics. The first segmentation routine (110) finds objects that are of the appropriate size and gray scale density br a premalignant or malignant cell. The second segmentation routine (115) finds objects which have a nucleus with a gray scale intensity texture that is of a "roughness" which is indicative of the nucleus of a premalignant or malignant cell.

The first segmentation routine (110), which is discussed more fully in U.S. Pat. No. 5,257,182 which is incorporated herein, performs a morphological well algorithm which filters out objects that are the size of a premalignant or malignant cell or smaller (120). The resulting image, containing only objects which are too large to be cancerous cell nuclei, is then subtracted from the original image containing all of the objects (125). Consequently, what is left are objects of the correct size or smaller. A separate image is then prepared from the original image which will contain only objects which are too small to be of concern (130). When this latter image, containing only objects which are too small, is then subtracted from the image having objects of the size of a possible cancerous cell or smaller, the resultant image will thus contain only images being of the size of a possible cancerous cell nucleus (135). The centroids of the objects in this image are then determined and the images centered around those centroids are sent to the secondary classifier for further classification (140).

The second segmentation routine (115) gauges the texture of the surface of the nucleus by estimating the fractal dimension of the area surrounding each pixel in the grey scale image. The fractal dimension analysis is performed using a Hurst operator. The Hurst operator is implemented in a manner that relies on fixed point arithmetic, a hardware ranker and lookup tables as opposed to conventional time consuming floating point operations. A detailed discussion of the Hurst operator is provided in Chapter 3 of "The Image Processing Handbook" by John C. Russ, CRC Press, 1992, which is incorporated herein by this reference. Typically the surface of the nucleus of a non-malignant cell will exhibit a fractal dimension significantly lower than the fractal dimension of the surface of a nucleus of a malignant or non-malignant cell. Since the Hurst coefficient bears a direct relationship to fractal dimension, the Hurst coefficient of various portions of the image can be used to further segment the image to find cells that are likely malignant. Further, it has been found that the fractal dimensions of various abnormalities tend to fall within certain ranges making it possible to identify specific dysplasias, such as adenocarcinomas, within the image. Additionally, the fractal dimension information can be used to segment out undesired material on the slide such as dirt and debris.

A 5 by 5 Hurst operator is used in this example although larger dimensions of the Hurst operator may be used. The 5 by 5 implementation uses the following octagonal pixel mask:

$$\begin{array}{ccccc} & \sqrt{5} & 2 & \sqrt{5} & \\ \sqrt{5} & \sqrt{2} & 1 & \sqrt{2} & \sqrt{5} \\ 2 & 1 & 0 & 1 & 2 \\ \sqrt{5} & \sqrt{2} & 1 & \sqrt{2} & \sqrt{5} \\ & \sqrt{5} & 2 & \sqrt{5} & \end{array}$$

where the value at each position in the mask represents the Euclidean distance from the center pixel (represented by zero in the mask) to the pixel at that position in the image.

The intensity image (105) is passed to a well known hardware implemented ranker, which determines the maximum grey scale intensity for the group of pixels at the distance 1 from the center pixel and stored the maximum as M(1) (145). The ranker computes a rank of the input pixels in a masked window which moves across the entire intensity image and outputs the maximum for each center pixel. The maximum value is then placed into a maximum image which stores the maximums found at a particular distance from the center pixel for each center pixel in the intensity image. The mask determines which pixels in the window are to be compared and ranked for the purposes of determining the maximum. For the case of the pixels at a distance of 1 from the center pixel, all pixels in the window surrounding the center pixel are masked with the exception of the pixels being at a distance of 1 from the center pixel, as indicated in the octagonal distance mask above. A suitable ranker would have the capacity to perform its ranking functions on an 8 by 8 grey scale intensity image. An example of a ranker is the L64220 Rank-Value Filter manufactured by LSI Logic Corporation. It may also be desirable to mask the outer 2 pixel wide border of the intensity image.

Once the maximums M(1) at the distance 1 have been found for all pixels in the intensity image, the intensity image is again passed to the ranker using the same masked window, but the ranker is instructed to provide the minimum intensities m(1) for the pixels at a distance of 1 from the center pixels (150). The minimums m(1) found for each center pixel in the intensity image are then stored in a minimum image and the maximums M(1) and minimums m(1) for the distances 1 are passed to the arithmetic logic unit ALU which calculates the differences between the maximum and minimum grey scale intensities for corresponding pixels in the maximum and minimum images, $Y_1 = M(1) - m(1)$, and stores the result at each pixel in a "delta" image.

The same procedure discussed above in steps 145 and 150 is repeated for the intensity image at the distances from the center pixels of 2, √2 and √5 to produce delta images of $Y_2$, $Y_3$ and $Y_4$ for these distances (155 and 160, 165 and 170, 175 and 180, respectively). In each case the ranker employs a different masked window to mask out all pixels which are not at the desired distance from the center pixel.

Once all four delta images have been determined, containing the grey scale intensity differences $Y_1$, $Y_2$, $Y_3$ and $Y_4$ for the intensity image, the slope of the plot of $\log Y_i$ as a function of the log of the distance $X_i$ from the corresponding center pixel must be determined for each pixel in the intensity image.

The slope of the plot for each pixel in the intensity image is the Hurst coefficient H for that pixel. The slope of the log $X_i$ log $Y_i$ plot can be determined by a least squares fit function represented as:

$$\text{slope} = \frac{n(\Sigma X_i Y_i) - \Sigma X_i \Sigma Y_i}{n(\Sigma X_i^2) - (\Sigma X_i)^2}$$

where:

n = the number of distance sets at which the grey scale intensities of the surrounding pixels were compared (4);

$X_i$ = the log of the distances 1, √2, 2, √5 from the center pixel (0, 0.1505, 0.3010, 0.3494, respectively);

$Y_i$ = the log of the grey scale differences for the set of pixels at the same distance from the center pixel.

This equation can be separated into components so that eventually a simple subtraction step can be performed to determine the slope, H:

$$H = A - B$$

where:

$$A = \frac{n}{n(\Sigma X_i^2) - (\Sigma X_i)^2} (\Sigma X_i Y_i)$$

and, $$B = \frac{\Sigma X_i}{n(\Sigma X_i^2) - (\Sigma X_i)^2} (\Sigma Y_i)$$

Since each distance $X_i$ from the center pixel is known, the portions of A and B independent of the intensity difference $Y_i$ can be solved as follows:

$$\frac{n}{n(\Sigma X_i^2) - (\Sigma X_i)^2} = 13.33$$

$$\frac{\Sigma X_i}{n(\Sigma X_i^2) - (\Sigma X_i)^2} = 2.670$$

Therefore, the Hurst coefficient H may be rewritten as:

$$H = 13.33 \Sigma X_i Y_i - 2.670 \Sigma Y_i$$

As the summation of the distances $X_i$ is also known, equation 7 can be expanded:

$$H = 13.33(0.1505 \log Y_2 + 0.3010 \log Y_3 + 0.3494 \log Y_4) - 2.670(\log Y_1 + \log Y_2 + \log Y_3 + \log Y_4)$$

By multiplying the constants and regrouping the variables, the following equation results:

$$H = (1.987 \log Y_4 + 1.342 \log Y_3) - (2.670 \log Y_1 + 0.664 \log Y_2)$$

In order to allow for a sample non-floating point grey scale subtraction step once the values for A and B have been determined, the coefficients in equation 9 are scaled so that A and B each can be a value between zero and 255. This is done by multiplying the coefficients of equation 9 by 31.82 to yield equation 10:

$$H = (63.22 \log Y_4 + 42.70 \log Y_3) - (84.94 \log Y_1 + 21.12 \log Y_2)$$

Accordingly, $$A = 63.22 \log Y_4 + 42.70 \log Y_3$$

and, $$B = 84.94 \log Y_1 + 21.12 \log Y_2$$

The possible values for A and B based on the corresponding intensity values are stored in a two value look up table for each of A and B, thus eliminating the need for floating point operations to solve equation 10.

Once the set of intensity differences $Y_i$ for a center pixel has been determined, the values for A and B can be found using the two value look up tables. The values of $Y_3$ and $Y_4$ are used to find a corresponding value in a two value look tip table for the A values (185), while the values for Y1 and Y2 are used to find the corresponding value in the two value look up table for B values (190).

Since the Hurst coefficient has previously been scaled by multiplying the equations for A and B by 31.82 so that the values for A and B would fall between zero and 255, it is desirable to rescale the Hurst coefficient by dividing it by 31.82 and multiplying the Hurst coefficient by 100 so that it is a convenient integer between zero and 200. This is done again in a two value look up table by finding a value in the look up table corresponding to the values obtained in separate tables for A and B (195). The resultant Hurst coefficient H is then stored in a scaled Hurst coefficient image at the location of the center pixel.

Since the intensity image contained cytoplasm and other material as well as the cell nuclei, information in the Hurst coefficient image which does not relate to a nucleus is preferably filtered out of the image. One way of performing this filter operation is by logically ANDing the Hurst coefficient image with an image of solely cell nuclei, such as the resultant image from step 135 described above relative to the first segmentation routine. In such a procedure, the Hurst coefficient image is preferably thresholded to assign pixels in the image having Hurst coefficients falling within a certain range a binary 1 while assigning pixels with Hurst coefficients outside the range a value of binary 0. By ANDing this binary Hurst image with a binary image having pixels falling within a nucleus assigned a binary 1 and pixels falling outside the nucleus assigned a binary 0, a resultant image is obtained which indicates the only those areas within the nuclei of the specimen that have a texture that is of interest (200). Alternatively, other filtering operations could be performed on the Hurst coefficient image to remove information from the image that does not relate to the texture of cell nuclei.

The objects identified as suspect by the texture segmentation routine may be used to further filter the number of objects identified as likely to represent malignant cells by the first segmentation routine based on cell size and grey scale intensity. Alternatively, the nuclei found to have Hurst coefficients in a suspicious range may be added to the objects identified by the first segmentation routine. In either case, the actual Hurst coefficient of a suspect cell may be sent along with the image of the suspect cell to the secondary classifier for further classification.

Given the discussion above and a general knowledge of image processors, such as the exemplary PIPE® image processor or a similar processor, a person of ordinary skill in the art could reduce the primary classification functions to appropriate software code for execution on a suitable image processor within a reasonable amount of time. As would be apparent, the code would be loaded, burned, or otherwise encoded into memory accessible by the image processor 42 for execution by the image processor.

An N×N array of pixels surrounding the centroid of a suspect cell, or a net image, identified by the primary classification function of the image processor 42 is then transferred to the general processor 46 for storage. In the case where the cell was identified by the texture segmentation routine as being suspect, the net image may be centered around the area of the cell nucleus found to have a Hurst coefficient within a suspect range. A secondary classification of the objects represented by these net images may then be performed.

The general processor 46 individually transfers each net image, and possibly its suspect Hurst coefficient, to the neurocomputer 44 for secondary classification. Alternatively more than one neurocomputer may be employed. For example, objects found to be suspect by the first segmentation routine may be sent to one neurocomputer, while objects found by the texture segmentation routine may be sent to a second, differently trained neurocomputer. The task of the secondary classification is to distinguish the premalignant and malignant cells from other objects which may pass the primary classifier, such as cell clumps, debris, clumps of leukocytes and mucus.

Based on training performed with a training set of several hundred or thousands of known benign and premalignant or malignant cells, as described more fully above, the neurocomputer 44 will assign each net image with a value, called a net value, ranging from 0.1 to 0.9, as determined by the likelihood that the object is a premalignant or malignant cell.

It should be recognized that while the image processor and digitizer 42, the general processor 46, and the neurocomputer 44 are described operating in a serial manner, in actual practice as many functions will be performed in parallel as is possible. Consequently, the components 42, 44, 46 may process different slide segments or different areas of a segment concurrently, greatly reducing the time required to screen a slide.

As noted above the secondary classifier is trained to associate a known benign image with an output of 0.1 and a known pathological image with an output of 0.9. Such outputs represent, for example, the degree of certainty that a cell is normal or abnormal, respectively. When the secondary classifier is presented with new, unknown cells, it generalizes from its training and attaches a net value to the image. The closer that the secondary classifier is able to categorize the unknown image into the benign category, the closer is its net value equal to 0.1. Conversely, the more closely that the unknown image appears to resemble the nonbenign images of its training set, the closer is the net value assigned to that image equal to 0.9.

Once all objects classified by the primary classifier to be possibly premalignant or malignant have been classified by the secondary classifier, the net values assigned to those objects by the secondary classifier are ranked from closest to 0.9 down to 0.1. The highest ranked 64 objects are then stored. This completes the end of the high resolution scan (35).

Once the highest ranked 64 objects in the specimen have been identified which are most likely to be malignant or premalignant, the high resolution rescan (40) is begun. During the rescan (40) the stage 14 will move the slide relative to the microscope 12 so that one of the highest 64 ranked object is in the viewing path of the microscope. The image is then focused according to the previously determined high resolution focus parameters, and the camera grabs, at 512×484 resolution, the 128×104 red, green and blue component image around the centroid location. This high resolution color tile is then stored in the memory 24, such as on an optical disk or tape. These operations are then performed for the next cell until all 64 of the highest ranked cells have been rescanned and their high resolution color images have been stored in the memory 24. This completes the rescan pass (40). The automated classifier 10 may then remove the slide and replace it with another slide for further classification.

Once stored, the 64 color tiles may be displayed as a summary screen in their descending order of ranking, their positioned relation to each other in the specimen, or in some other arrangement. The tertiary classification performed by a cytotechnician can then take place at any time.

STATEMENT OF INDUSTRIAL APPLICATION

The present invention is applicable to any system which employs textured surface analysis or fractal analysis, including navigational systems and other systems dependent upon analysis of the contour of the surface and is particularly applicable in biologic classification in general and more particularly in the classification of cytological specimens, such as Pap smears, and histological specimens.

What is claimed is:

1. A method for classifying objects within a specimen as likely to be premalignant or malignant cells, comprising the steps of:

a) forming an intensity image of at least part of a specimen using a microscope;

b) using a processing element to find and store the maximum and minimum grey scale values at plural distances from a pixel in said intensity image;

c) finding the difference between the maximum and minimum grey scale values at the respective distances from said pixel using an algorithmic logic unit;

d) determining the slope of the log of said differences as a function of the log of said distances to provide a measure of intensity texture; and e) classifying objects in said intensity image as likely to be malignant or premalignant based on the value of said slope.

2. The method of claim 1, wherein said step of determining the slope includes using a least squares fit.

3. The method of claim 1, wherein said step of determining the slope includes using a two value look up table.

4. The method of claim 1, including determining the Hurst coefficient based on said slope.

5. The method of claim 1, wherein said step of classifying includes using a neural network.

6. The method of claim 1, including forming a resultant image based on said slopes and masking out information in said resultant image which does not correspond to the location of cell nuclei in the intensity image.

7. A method for classifying objects based on surface texture, comprising the steps of:

a) forming an intensity image of at least part of the surface of the object using a camera;

b) using a hardware ranker to find the maximum and minimum grey scale values at plural distances from each pixel in said intensity image;

c) subtracting the minimum grey scale values from the maximum grey scale values at the respective distances from each said pixel using an algorithmic logic unit;

d) looking up the slope of the log of said differences as a function of the log of said distances in a look up table for each said pixel to provide a measure of intensity texture; and e) classifying objects in said intensity image as likely to have a certain characteristic based on the values of said slopes.

8. A system for classifying objects based on surface texture, comprising:

a camera which obtains an intensity image of at least part of the surface of the object;

a ranker which finds the maximum and minimum grey scale values at plural distances from each pixel in said intensity image;

an arithmetic logic unit which subtracts the minimum grey scale values from the maximum grey scale values at the respective distances from each said pixel;

a lookup table containing the slope of the log of said differences as a function of the log of said distances, the slope for providing a measure of intensity texture; and a classifier for classifying objects in said intensity image as likely to have a certain characteristic based on the values of said slopes.

9. The system of claim 8, wherein said lookup table is a two value look up table.

10. The system of claim 8, including a plurality of two value lookup tables.

11. The system of claim 8, wherein said classifier includes a neurocomputer.

12. The method of claim 1, wherein the processing element includes a hardware ranker.

* * * * *